United States Patent [19]

Turiot

[11] 4,422,602
[45] Dec. 27, 1983

[54] TRIPOD TYPE LANDING GEAR

[75] Inventor: Andre Turiot, Morsang S/Orge, France

[73] Assignee: Messier-Hispano-Bugatti (S.A.), Montrouge, France

[21] Appl. No.: 361,218

[22] Filed: Mar. 24, 1982

[30] Foreign Application Priority Data

Mar. 27, 1981 [FR] France ................................ 81 06155

[51] Int. Cl.³ ............................................. B64C 25/10
[52] U.S. Cl. ................................................ 244/102 R
[58] Field of Search ......... 244/100 R, 102 R, 102 SS, 244/102 SL, 104 R, 104 FP, 50

[56] References Cited

U.S. PATENT DOCUMENTS

| 3,807,667 | 4/1974 | Lucien et al. | 244/102 R |
| 3,951,361 | 4/1976 | Hrusch | 244/102 R |
| 4,147,316 | 4/1979 | Kendall et al. | 244/102 R |
| 4,170,332 | 10/1979 | Masclet et al. | 244/102 R |
| 4,189,117 | 2/1980 | Masclet et al. | 244/102 R |

FOREIGN PATENT DOCUMENTS 720194  4/1942  Fed. Rep. of Germany ... 244/102 R

Primary Examiner—Galen L. Barefoot
Attorney, Agent, or Firm—Sughrue, Mion, Zinn, Macpeak and Seas

[57] ABSTRACT

This invention relates to landing gears. The described landing gear is characterized essentially by the fact that it comprises a leg (3) at one end of which is fixed a wheel (14) for rolling around a pivoting pin (11), a shock absorber (15) of which one end (22) is connected to leg (3), a strut (24) whose end is connected to leg (3) and links (39, 37, 41) connecting the end of strut (24) to the pivoting pin (11) so as to cause the wheel to pivot when the landing gear is retracted. This landing gear finds an advantageous application as a fuselage landing gear of the tripod type.

7 Claims, 1 Drawing Figure

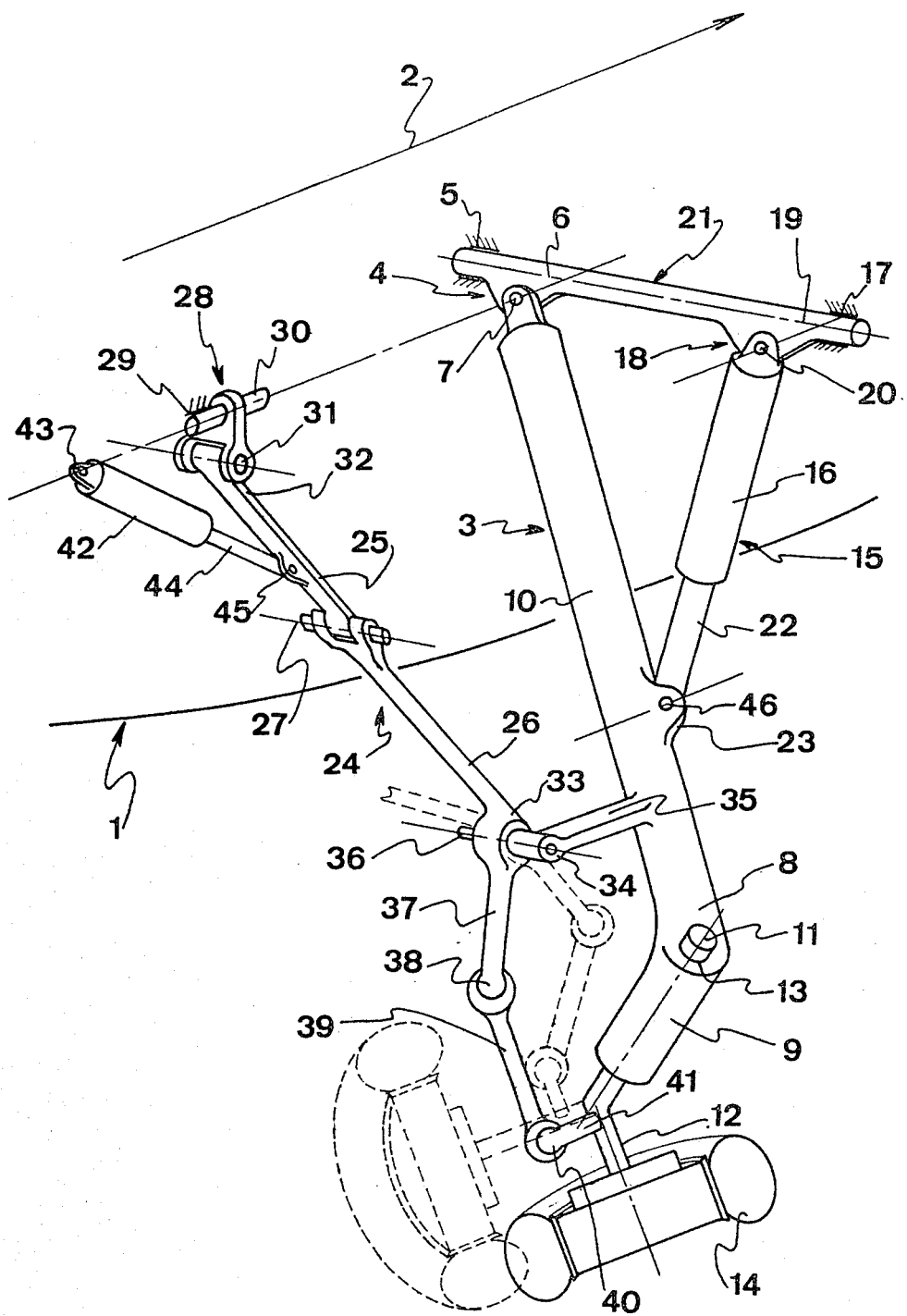

TRIPOD TYPE LANDING GEAR

FIELD OF THE INVENTION

The present invention relates to landing gears of the tripod type and more particularly to landing gears which are retractable and which are housed in wells provided in the fuselage of the aircraft on which they are mounted.

BACKGROUND OF THE INVENTION

Such landing gears of the tripod type are already known to the prior art. These landing gears consist essentially of a leg of which one end is fixed at a first point of the aircraft; a shock absorber of which end is fixed at a second point of the aircraft different from the first, and a strut of which one end is fixed at a third point of the aircraft, evidently different from the other two. These three elements are then connected substantially on their other ends at the same fourth point to form a trihedral whose apex is turned downward when the aircraft is rolling on the ground. This apex or fourth point supports the traveling means, for example, one or more wheels. This design in the form of a trihedral which is inverted when the landing gear is extended has given rise to the name "tripod landing gears" well known to aeronautical technicians. These fixing points mentioned above are given only as a general indication of a fixing location and, in practice, these "points" consist of cardan joints, knuckle joints, pins, etc., which are defined according to landing gear design rules to ensure traveling, shock absorption and the movement of the landing gear from one position to another, i.e. the retracted and extended positions.

Among landing gears of this tripod type, there is one which makes it possible to pivot the wheel by about 90 degrees when the landing gear moves from one of the two positions to the other as defined above. This rotation of the wheel allows the landing gear, when it is retracted into its well in the fuselage, to occupy a smaller volume and hence to be housed more easily.

This rotation of the wheel is obtained by means of a so-called tripod landing gear structure in which the end of the strut connected to the leg at the fourth point defined above comprises a rotary ring around the leg and two rotary links turning in relation to each other around the same axis at one of their ends, the two other respective ends of the two links being connected to the strut and to a pin supporting the aircraft wheel and capable of pivoting in a bearing provided for this purpose in the leg.

With this configuration, when the landing gear goes from one position to the other, the strut undergoes a rotation which causes a rotation of the wheel with the same amplitude thanks to the pivoting ring mounted around the wheel.

This type of embodiment gives the desired results, i.e. pivoting of the wheel when the landing gear goes from one position to the other, but the above description of the structure of this landing gear shows that it is relatively complicated.

It is the object of the present invention to provide a retractable landing gear of the tripod type allowing a rotation through a certain angle of the rolling means, i.e. a wheel in the most current cases, when the landing gear goes from one position to the other, I.e. moves between the retracted and extended positions, so that when the landing gear is extended the plane of the wheel is parallel to the axis of the aircraft and, when the landing gear is retracted, the plane of this wheel has undergone a rotation in relation to the leg which supports it and so that, for example, this wheel plane always remains parallel to the axis of the aircraft. More precisely, it is the object of the present invention to provide a landing gear having the simplest structure while minimizing the number of its components compared with those of the prior art, particularly to secure an improvement in the reliability of these types of landing gear.

The present invention accordingly provides retractable landing gear of the tripod type for a rigid-frame aircraft, comprising:

a leg capable of being connected on a first end at a first fixed point of the aircraft frame via a first cardan joint to two, first and second, pins, said leg being mounted rotatably around the second pin, the other end of said leg supporting a pivoting pin on which can be mounted a rolling means, a shock absorber of which one end can be connected at a second fixed point of said frame via a second cardan joint to two, third and fourth, pins, said shock absorber being mounted rotatably around the fourth pin, the other end of said shock absorber being connected at a point of said leg around a fifth pin, this point being located near the aforesaid pivoting pin, a strut of which one end is capable of being connected at a third fixed point of said frame via a third cardan joint to two, sixth and seventh, pins, said strut being mounted rotatably around the seventh pin, the other end of said strut being connected to said leg through an eighth pin substantially near said pivoting pin, said strut being made up of at least two levers pivoting in relation to each other around a ninth pin, connection means between the end of said strut cooperating with the eighth pin and said pivoting pin supporting the rolling means, and means for controlling the alignment of the two levers of said strut, the said first, third, seventh, eighth and ninth pins being parallel in one direction whereas the second, fourth, fifth and sixth pins are parallel in a second direction, these two directions forming a non-zero angle between them.

According to one feature of the invention, the two said directions are perpendicular.

According to another feature of the present invention, the connection means between the end of said strut cooperating with the eighth pin and said pivoting pin supporting the rolling means comprise a link whose two ends are connected via knuckle joints with two stems respectively integral with said strut and with said pivoting pin so as to form two rotating moments respectively in relation to said eighth pin and to said pivoting pin.

According to a further feature of the present invention, said first and third pins are colinear.

According to yet another feature of the invention, the second and sixth pins are colinear.

Other characteristics and advantages of the present invention will appear from the following description given as an illustration in connection with the appended drawing representing a perspective view of an embodiment of a retractable landing gear of the tripod type according to the invention.

BRIEF DESCRIPTION OF THE DRAWINGS

The single FIGURE is a perspective view which represents an embodiment of a retractable landing gear of the tripod type designed to be mounted on an aircraft.

DESCRIPTION OF THE PREFERRED EMBODIMENT

The aircraft fuselage and frame are represented schematically at 1 and in which the axis of the aircraft is represented at 2.

As indicated previously, this type of landing gear is designed to retract into a well provided along and within the fuselage of the aircraft. For this reason, when the landing gears retract, it is necessary that they occupy a minimum space, especially in the case of highly streamlined aircraft.

One solution consists in retracting the landing gear while having the wheel turn by 90 degrees so that it remains parallel to the axis of the aircraft and not perpendicular because it can be understood that in this position it takes up more space.

The landing gear shown in the Figure makes it possible to achieve this result.

To accomplish this, its structure comprises a leg 3 fixed at 5 on the frame 1 of the aircraft by means of the cardan joint 4 having two rotating pins 6 and 7 advantageously perpendicular, pin 6 being integral with the frame 1 of the aircraft while the pin 7 connects the leg 3 to the cardan joint 4.

The other end 8 of the leg 3 supports, in a bearing 9 forming an elbow with the body 10 of the leg 3, a pivoting pin 11 whose end which emerges at 12 forms an angle with the part 13 maintained in the bearing 9 so that this part 12 is substantially parallel to the ground when the landing gear is mounted on an aircraft and the latter is on the ground.

In fact, this emerging part 12 can constitute a means for the support of rolling means, for example a wheel 14.

More classically, and in a better known manner, in order to give the aircraft a better seating, the leg 3 moves substantially away from the fuselage 1, especially when the weight of the aircraft bears on the landing gears and compresses the shock absorbers associated with these landing gears.

The landing gear thus comprises a shock absorber 15 of which one end, notably the cylinder 16, is connected at another fixed point 17 of the aircraft frame via a cardan joint 18 having two pins 19 and 20 preferably perpendicular to each other and chosen so that they remain respectively parallel to the pins 6 and 7 of the cardan joint 4 and, advantageously, so that the pins 6 and 19 are colinear and belong to the same shaft 21 maintained in two bearings respectively located in the vicinity of the points 5 and 17.

The other end of the shock absorber, notably the rod 22, is rotatably connected at a point 23 located on the body 10 of the leg 3, via a pin 46 which is imperatively parallel to the two pins 7 and 20 previously defined.

As mentioned above, this landing gear is of the tripod type, the two first elements being composed of the leg 3 and the shock absorber 15, the third being composed of a strut 24 consisting of two levers 25 and 26 rotating in relation to each other around a pin 27. A first end 32 of this strut, capable of "breaking" around the pin 27, is connected via a third cardan joint 28 to a third fixed point 29 integral with the aircraft frame 1. This joint includes two pins 30 and 31 advantageously perpendicular, the pin 30 cooperating with the frame while the pin 31 connects the joint to the end 32 of the strut, i.e. the lever 25.

The other end 33 of this strut or that of the lever 26 is connected to a point 34 of the body 10 of the leg 3. This point 34 is located in the vicinity of the point 23 previously defined and relatively near the bearing 9.

Advantageously, it is located on a projecting part 35 which carries a pin 36 on which is rotatably mounted the end 33 of the strut 24.

As will be explained, these pins 31, 27 and 36 are parallel to each other and to the pins 6 and 19, and the pin 30 is colinear with the pin 7. This imperative condition allows the landing gear to operate as will be explained below.

In the embodiment illustrated in the figure, the lever 26 is extended by a curved stem 37 beyond the pin 36. It is terminated by a knuckle ball 38.

This knuckle ball is connected through a rigid link 39 to another knuckle ball 40 integral with a stem 41 fixed on the emerging part 12 of the pivoting pin 11. These two stems 37 and 41 connected by the link 39 by means of the knuckles 38 and 40 make it possible to describe two rotating moments in relation to the two pins 36 and 11 and, as will be explained below, to pivot the wheel.

Finally, the landing gear includes a means for controlling the alignment of the two levers 25 and 26 and keeping them in this position. This means consists advantageously of a lockable cylinder 42 of which one end is connected to the lever 25 and the other to a fixed point in relation to the frame. Advantageously, the end 43 of the cylinder is connected to the frame by a cardan joint placed on the line passing through the two pins 30 and 7. The other end 44 is rotatably connected by a pin 45 to the lever 25, this pin being parallel to the pins 31, 27 and 36.

The operation of the landing gear when it is rolling on the ground and when it moves from the extended position to the retracted position and vice versa is the following:

It is first of all pointed out that the landing gear is represented in the extended position and, when it is on the aircraft, the axes of the pins 30, 7, 20 and 46 are chosen so that they are parallel to the axis 2 of the aircraft. The dotted lines represent the relative movements of the different elements making up the landing gear when it retracts into the well in the fuselage 1.

When the aircraft is rolling on the ground, the cylinder 42 has its maximum length and the two levers 25 and 26 are aligned and maintained in this position by the locking of the cylinder. Under these conditions, when the wheel 14 encounters an obstacle in relief or a hollow, the leg 3 and the strut 24 rotates around the pins 30 and 17 and the rod 22 enters into or comes out of the cylinder 16 (depending on the case) to dampen the shock, the shock absorber thus undergoing a rotation around its pin 20.

All these movements are possible because, as explained earlier, the two pins 30 and 7 are on the same line (as is the pin of the cardan joint 43 of the cylinder 42) and the two pins 46 and 20 are also parallel to these two pins 30 and 7.

Very schematically, the leg 3 moves in a plane perpendicular to the axis of the aircraft 2 so that the wheel 14 always remains parallel to this axis 2.

On the other hand, when the aircraft is in flight in the direction indicated on the axis 2 and the landing gear has to be retracted, the following operations are carried out:

- the cylinder 42 is actuated to obtain a reduction in its length; hence, the alignment of the two levers 25 and 26 is broken and the pulling of the cylinder is transmitted in part to the pin 36;
- the leg 3 with its shock absorber 15 which is extended begins to turn clockwise around the two colinear axes 6 and 19 (as represented in the figure) whereas the lever 26 turns counterclockwise;
- when the strut is completely folded, the leg is retracted completely into the fuselage 1 of the aircraft.

It is however noted that when the lever 26 undergoes its counterclockwise rotation it carries in this rotation the stem 37 whose end tends to move away from the knuckle ball 40 of the stem 41. As these two balls are connected by a link 39, the rotation of the stem leads to that of the stem 41 and hence the wheel 14 around the pivoting pin 11. As the rotation of the lever 26 is about 90 degrees, the rotation of the wheel is of equivalent amplitude.

Hence, when the landing gear is completely raised, the wheel takes on a position, in relation to the leg 3, as shown by the dotted lines in the figure.

Finally, when the landing gear must be lowered to go from the retracted position to the extended position, the operations described above are carried out in the same manner but in reverse so that the wheel comes back to a plane parallel to the axis 2 of the aircraft.

What is claimed is:

1. Retractable landing gear of the tripod type for a rigid-frame aircraft, comprising:

a leg capable of being connected on a first end at a first fixed point of the aircraft frame via a first cardan joint to first and second pins, including means for mounting said leg rotatably around the second pin, the other end of said leg supporting a pivoting pin on which can be mounted a rolling means, a shock abdsorber of which one end can be connected at a second fixed point of said frame via a second cardan joint to third and fourth pins including means for mounting said shock absorber rotatably around the fourth pin, the other end of said shock absorber being rotatably connected at a point on said leg around a fifth pin, said point on said leg being located near the aforesaid pivoting pin, a strut of which one end is capable of being connected at a third fixed point of said frame via a third cardan joint to sixth and seventh pins including means for mounting said strut rotatably around the seventh pin, the other end of said strut being connected to said leg through an eighth pin substantially near said pivoting pin, said strut being made up of at least two levers pivoting in relation to each other around a nineth pin, connection means between the end of said strut cooperating with the eighth pin and said pivoting pin supporting the rolling means, and means for controlling the alignment of the two levers of said strut, with said first, third, seventh, eight and ninth pins being parallel in one direction, and the second, fourth, fifth and sixth pins being parallel in a second direction with said two directions forming a non-zero angle between them.

2. The landing gear of claim 1 wherein said two directions are perpendicular.

3. The landing gear of either of claims 1 or 2 wherein the connection means between the end of said strut cooperating with the eighth pin and said pivoting pin supporting the rolling means comprise a link whose two ends are connected via knuckle joints with two stems respectively integral with said strut and with said pivoting pin so as to form two rotating moments respectively in relation to said eighth pin and to said pivoting pin.

4. The landing gear of claim 1, wherein said first and third pins are colinear.

5. The landing gear of claim 1, wherein the second and sixth pins are colinear.

6. The landing gear of claim 1 wherein said means for controlling the alignment of said two levers consist of a cylinder of which one end is connectable to the frame and the other end is connected to one of the two said levers.

7. The landing gear of claim 6 wherein said cylinder is lockable.

* * * * *